United States Patent
Reutter et al.

(10) Patent No.: US 7,140,958 B2
(45) Date of Patent: Nov. 28, 2006

(54) APPARATUS AND METHOD FOR DIVIDING A SAUSAGE STRAND

(75) Inventors: Siegfried Reutter, Eberhardzell (DE); Gerhard Schliesser, Wain (DE); Manfred Bachtle, Schemmerhofen (DE); Markus Schliesser, Wain (DE)

(73) Assignee: Albert Handtmann Maschinenfabrik Gmbh & Co, KG., Biberach/Riss (DE)

( * ) Notice: Subject to any disclaimer, the term of this patent is extended or adjusted under 35 U.S.C. 154(b) by 0 days.

(21) Appl. No.: 11/082,255

(22) Filed: Mar. 17, 2005

(65) Prior Publication Data

US 2005/0221743 A1    Oct. 6, 2005

(30) Foreign Application Priority Data

Apr. 1, 2004    (EP) .................................. 04007984

(51) Int. Cl.
   *A22C 11/00* (2006.01)
(52) U.S. Cl. ......................................... 452/51
(58) Field of Classification Search .............. None
   See application file for complete search history.

(56) References Cited

U.S. PATENT DOCUMENTS

| 4,073,039 A | * | 2/1978 | Muller et al. ................. 452/47 |
| 4,624,030 A |   | 11/1986 | Dreisin et al. |
| 4,670,942 A | * | 6/1987 | Townsend ..................... 452/37 |
| 4,787,122 A | * | 11/1988 | Vinokur ........................ 452/35 |
| 5,279,516 A | * | 1/1994 | Townsend ..................... 452/48 |

FOREIGN PATENT DOCUMENTS

| DE | 92 11 979 | 11/1992 |
| DE | 198 24 829 | 12/1999 |
| GB | 812 307 | 4/1959 |

OTHER PUBLICATIONS

European Search Report, European Patent Application No. 040079840.0, dated Sep. 22, 2004.

* cited by examiner

*Primary Examiner*—Thomas Price
(74) *Attorney, Agent, or Firm*—Marshall, Gerstein & Borun LLP (57) ABSTRACT

An apparatus for dividing a sausage strand includes at least two opposite spaced-apart guide elements having a distance which can be adapted to a sausage caliber such that the filled sausage strand can be moved between and through the guide elements in the transportation direction along a first axis and rotated by the guide elements about the first axis, and a means for jointly rotating the guide elements about the first axis. The sausage strand is first filled with a filling tube of a filling unit, and then guided in the transportation direction through the at least two opposite spaced-apart guide elements whose distance can be adapted to the sausage caliber, and the guide elements are rotated about a first axis extending along the transportation direction, wherein the filled sausage strand is also rotated about the first axis, the filled sausage strand being simultaneously supported at a place in the transportation direction behind the guide elements.

25 Claims, 8 Drawing Sheets

APPARATUS AND METHOD FOR DIVIDING A SAUSAGE STRAND

REFERENCE TO RELATED APPLICATION

This disclosure claims priority to European Application No. 04007984.0, filed on Apr. 1, 2004.

FIELD OF THE DISCLOSURE

The present disclosure relates to an apparatus and a method for dividing a sausage strand, particularly an endless sausage strand with co-extruded casing, and to an apparatus for making sausage.

BACKGROUND OF THE DISCLOSURE

In automatic sausage production, filling machines are normally used. Such filling machines introduce sausage meat through a filling tube into a sausage casing. To this end the sausage casing is directly positioned in a loosely folded state on the filling tube or in a corresponding sleeve which is slid over the filling tube. In general, a so-called skin brake or a brake ring is positioned at the end of the filling tube. After ejection of a sausage meat portion from the filling tube, which portion corresponds to an individual sausage, the sausage casing is twisted off with the help of the brake ring gear or a twist-off device. To press the sausage meat through the filling tube, a corresponding filling unit is used that conveys the sausage meat into the filling tube. Such a filling machine is e.g. described in European patent application 0 232 812. The sausage meat can be ejected intermittently or also continuously, particularly in connection with a coextrusion method.

Two twist-off methods which are used during simultaneous filling and twisting off are in principle known on the market.

In the first known method, the skin casing and a twist-off sleeve are rotated with the support of a brake rubber. In this method the skin casing which is positioned between the rotating or stationary brake rubber and the rotating filling nozzle is rotated. To ensure the entry of the twist-off point in the sausage strand, the sausage to be twisted off must simultaneously be retained to prevent rotation. The sausage can be retained by hand, by conveyor belts, transport chains, rollers, skin guiding tube or length portioning device.

Figure 9:
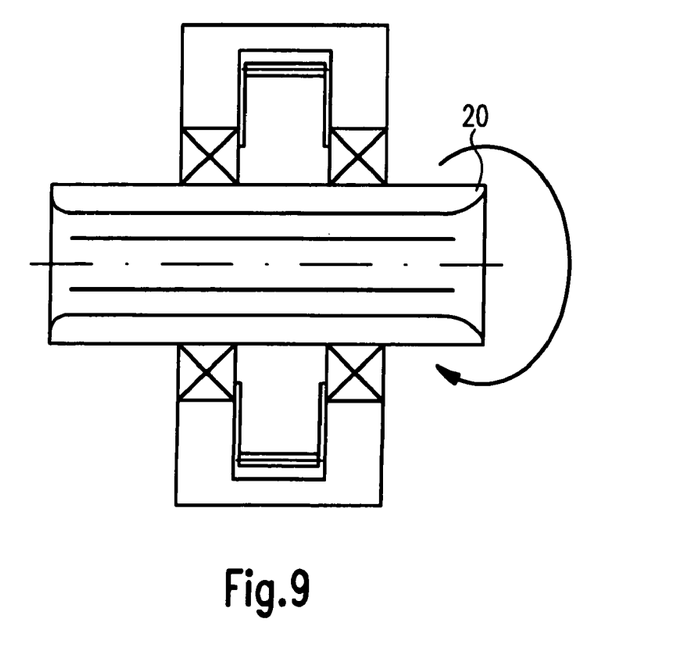
FIG. 9 is a schematic side view showing a twist-off sleeve according to the prior art.

A further possibility consists in rotating a twist-off sleeve, as known in a second method. In this method the already filled skin is rotated on the outer diameter by means of a twist-off sleeve. Likewise, as is not separately shown in FIG. 9, a support is required. In the case of sensitive sausage casings the filling nozzle must additionally be rotated.

The two known methods described above have the drawback that caliber-dependent shaped parts, here: brake rubber or twist-off sleeve, are needed.

SUMMARY OF THE DISCLOSURE

Starting from this, it is the object of the present disclosure to provide an improved method and an improved apparatus for dividing a sausage strand, which do not require any caliber-dependent shaped parts and thus permit an easy retrofitting of the apparatus to match different calibers, especially in the case of endless sausage strands with co-extruded casing.

According to the disclosure this object is achieved by an apparatus for dividing a sausage strand, the apparatus comprising at least two opposite spaced-apart guide elements having a distance which can be adapted to a sausage caliber such that the filled sausage strand can be moved between and through the guide elements in a transportation direction along a first axis and rotated by the guide elements about the first axis, and a means for jointly rotating the guide elements about the first axis.

The object is further achieved by a method for dividing a sausage strand, the method comprising the following steps:
filling a sausage strand with a filling tube of a filling unit,
guiding the filled sausage strand in transportation direction through at least two opposite spaced-apart guide elements whose distance is adapted to the sausage caliber,
rotating the guide elements about a first axis which extends along the transportation direction, the filled sausage strand being also rotated about the first axis, and
supporting the filled sausage strand at a place in transportation direction behind the guide elements while the filled sausage strand is rotated about the first axis.

The present disclosure entails the advantage that the filled sausage strand is rotated about a first axis by at least two opposite spaced-apart guide elements which are jointly rotated about a first axis. The distance of the two guide elements can be adapted to a specific sausage caliber so that a simple retrofitting is possible without the need for special shaped parts, such as brake rubber or twist-off sleeves, as is the case in the prior art.

According to a preferred embodiment of the present invention, at least one guide element, but preferably two opposite guide elements are rotatably supported in a direction perpendicular to the first axis. This reduces the friction resistance between filled sausage strand and guide elements in transportation direction, whereby also extremely sensitive skin casings, i.e. e.g. also co-extruded skin casings, can be used. While the filled sausage strand is being moved in transportation direction, i.e. draw-off direction, the guide elements can rotate with the filled sausage strand in transportation direction.

This makes it possible that even if the distance of the guide elements relative to one another is set smaller than the outer diameter of the sausage strand, so that the sausage strand can be reliably rotated on the outer diameter by means of the guide elements, the sausage strand can nevertheless move in transportation direction. When the distance of the guide elements relative to one another is set smaller than the outer diameter of the sausage strand, there is the problem at the beginning of the strand that the soft sausage strand can only be threaded in between the guide elements (rollers) with difficulty or is accumulated. That is why the guide elements must first be adjusted such that they are slightly wider apart at the beginning of production and after the sausage strand has been guided through the guide elements, a narrower adjustment can be resumed. This, however, has the consequence that the production must be interrupted once again to change the setting, and the beginning of the sausage strand cannot be used because of the changed production.

According to the present disclosure, the apparatus can therefore further comprise a means which holds at least one guide element with a resilient force at an adjusted caliber. Prior to start of the production one or several guide elements can then be spread against the resilient force and e.g. be locked. After the sausage strand has been threaded in at the beginning of production, said locking is undone, for instance by a lever secured to a housing, and the guide elements enter again into the position set for the sausage caliber, so that production need not be interrupted.

According to a further embodiment the apparatus may still comprise a drive for the guide elements for rotating at least one of the guide elements about the second axis. The resistance can thus be considerably reduced between filled sausage strand and guide elements, which, as has already been described above, also permits the use of very sensitive skin casings. Furthermore, the driven guide elements can then be used as conveying means to convey the filled sausage strand or the twisted-off sausages in transportation direction, so that no additional conveying means is needed.

According to the present disclosure, there is further a means for adjusting the distance of the opposite guide elements relative to one another and for centrally aligning the opposite guide elements relative to the filling tube, so that the apparatus can be exactly aligned relative to the center of the filling tube and exactly adapted to the filling caliber. Such a means comprises, for instance, an adjustment spindle for adjusting the position of the guide elements in vertical direction relative to one another.

Preferably, the means for rotating the guide elements about the first axis comprises a driven sleeve which is rotatably supported about the first axis and on which the guide elements are secured opposite each other so that they rotate with the sleeve about the first axis.

The guide elements are e.g. rollers and/or endless conveyor belts and/or endless transport chains and/or slide surfaces which have e.g. a low coefficient of friction. Several series-arranged pairs of rollers are also possible.

The apparatus may further comprise a means for retaining the filled sausage strand which is arranged in the transportation direction behind the guide elements to ensure the entry of the twist-off location after the guide elements. To support the sausages, known systems, such as conveyor belt, transport chain, rotatable rollers or manual method, are possible in the known manner. The means for retaining the filled sausage strand prevents the further rotation of the sausage strand about the first axis. Furthermore, the apparatus may comprise a displacer unit with displacer elements. Moreover, the apparatus may further comprise a coextrusion head for producing co-extruded sausage casings, so that the casing of the sausage strand is extruded by a coextrusion head during filling. Advantageously, at least two spaced-apart apparatuses are arranged one after the other in the transportation direction for dividing a sausage strand, the apparatuses being preferably drivable in synchronism with one another. Hence, it is ensured that a sausage strand which has not hardened yet does not tear off because such a strand must travel some distance for hardening.

In the apparatus of the disclosure used for making sausage, the filling tube may be rotatable and the drive for the filling tube may be synchronized with the drive of the means for rotating the guide elements.

In the method of the disclosure the distance of the guide elements is first set to be larger than the sausage strand diameter, the sausage strand end is then guided therethrough, and the distance of the guide elements is then set to be smaller than the sausage strand diameter.

In the method of the invention the distance of the guide elements is first set to be larger than the sausage strand diameter, the sausage strand end is then guided therethrough, and the distance of the guide elements is then set to be smaller than the sausage strand diameter.

BRIEF DESCRIPTION OF THE DRAWINGS

The present disclosure will now be explained in more detail with reference to the present figures, of which.

DETAILED DESCRIPTION OF THE DISCLOSURE

Figure 8:
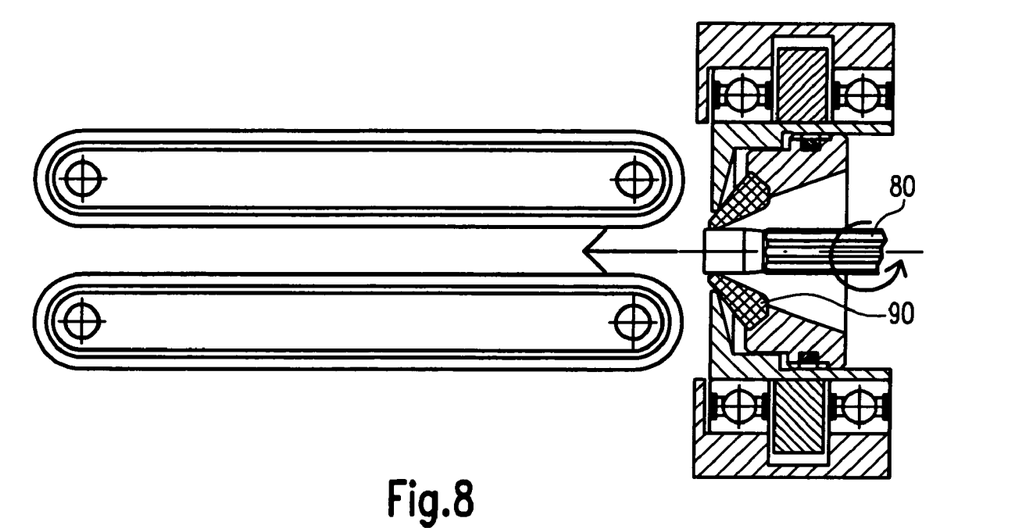
FIG. 8 is a schematic side view showing a twist-off device according to the prior art.

The first prior art method (described above) is shown in FIG. 8 where the skin casing and the twist-off sleeve are rotated with the support of the brake rubber 90, with the rotating skin casing positioned between the rotating or starting break rubber 90 and the rotating filling nozzle 80.

The second prior art method (also described above) is shown in FIG. 9, where the already filled skin is rotated on the outer diameter by means of the twist-off sleeve 20.

Figure 3:
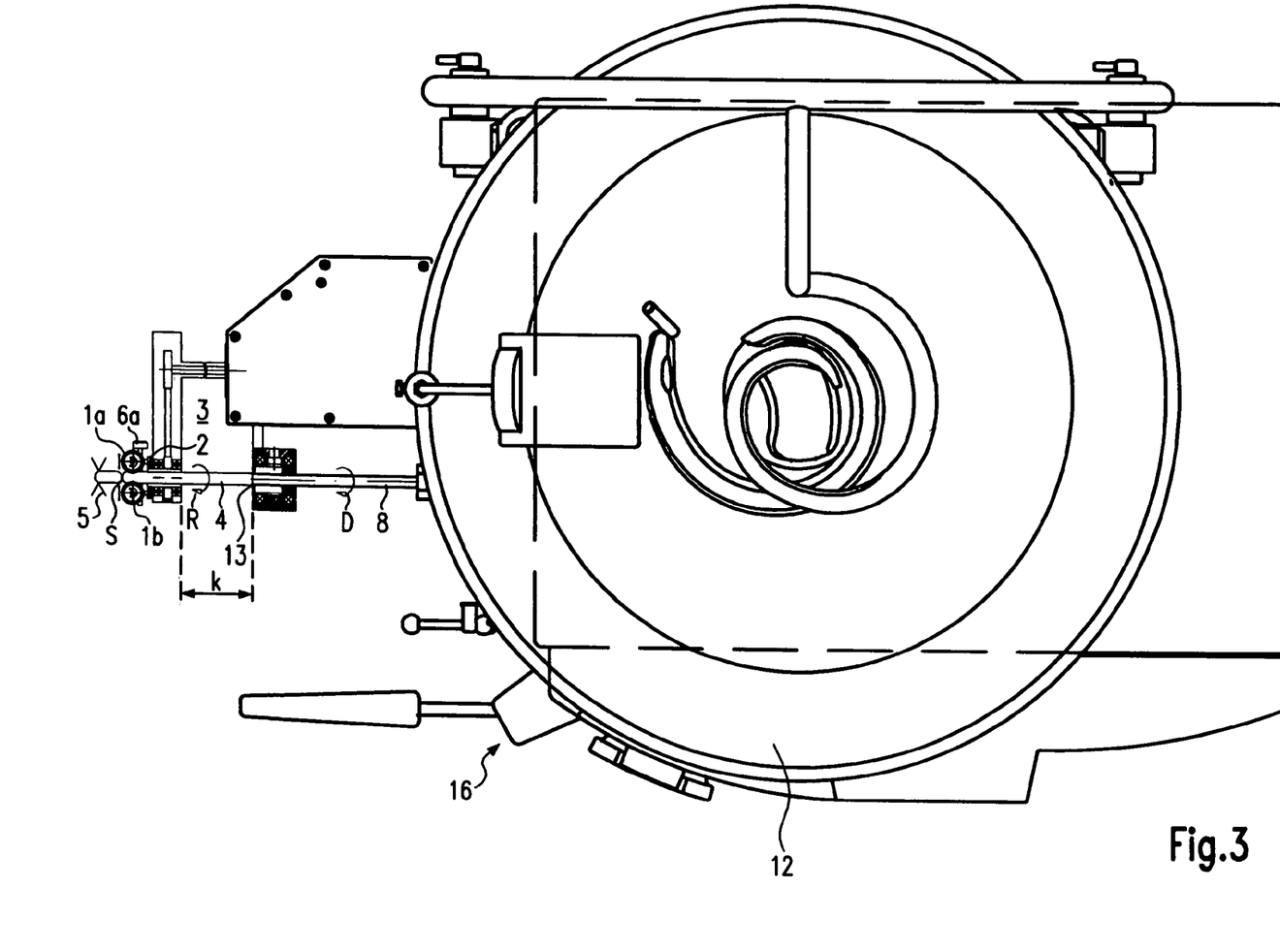
FIG. 3 is a top view showing an apparatus for making sausage according to the present disclosure.

FIG. 3 shows an apparatus for making sausage according to the present disclosure. The apparatus for making sausage comprises a filling unit, here: vacuum filler 16, which essentially consists of a funnel 12 for the sausage meat and of a preferably rotatably supported filling tube 8. The filling unit 16 further comprises a filling means, e.g. a feed pump (not shown), which conveys the sausage meat e.g. intermittently or continuously into the filling tube 8. FIG. 3 shows a vacuum filler with extrusion head 13. The extrusion head 13 comprises at least one preferably annular extrusion nozzle and is preferably fixedly connected to the filling tube and thus rotatably supported. During coextrusion the sausage meat is fed through the filling tube 8 as inner mass and, at the same time, casing material is supplied as outer mass in the transportation direction T. The exact function, construction and arrangement of such a coextrusion head is e.g. described in EP 1371293 A1. As an alternative to extrusion head 13, a vacuum filler with a brake ring rubber may be used although this is not explicitly shown in the figures. A skin casing is here put over the filling tube 8 after a retaining means has been pivoted away.

The skin end positioned in transportation direction is closed and the skin is then filled via the filling tube 8 with the sausage meat transported out of the funnel 12. At a distance k from the front filling tube end, the apparatus of the disclosure rubber is used, distance k is within a range of 0 to 100 mm, but it could also be larger. With co-extruded sausage casings, the distance may also amount up to about 3 m because the sausage casing needs some time to harden and therefore in a continuous production process also some distance for traveling.

Figure 1:
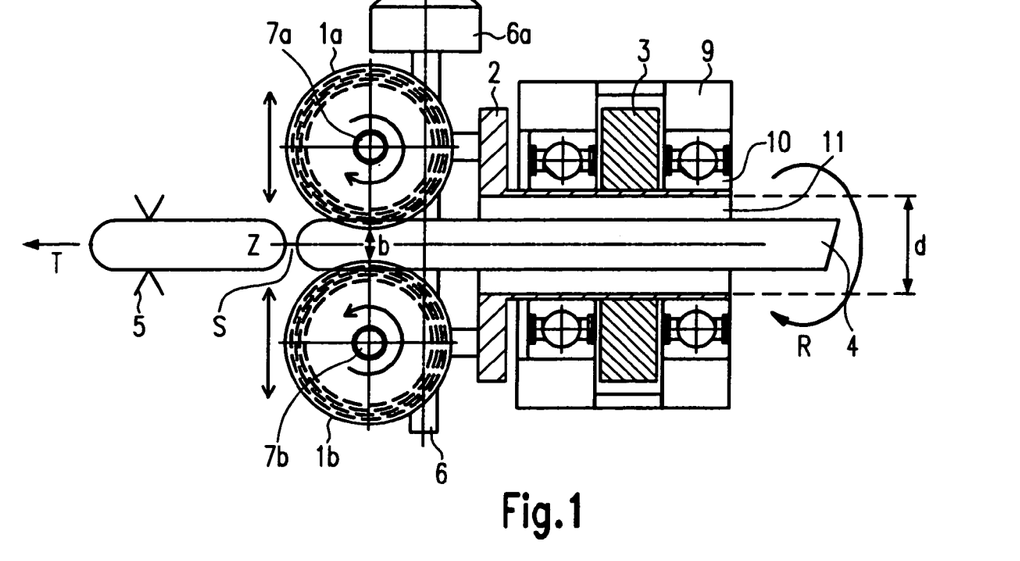
FIG. 1 is a schematic side view showing an embodiment according to the present disclosure.
Figure 2:
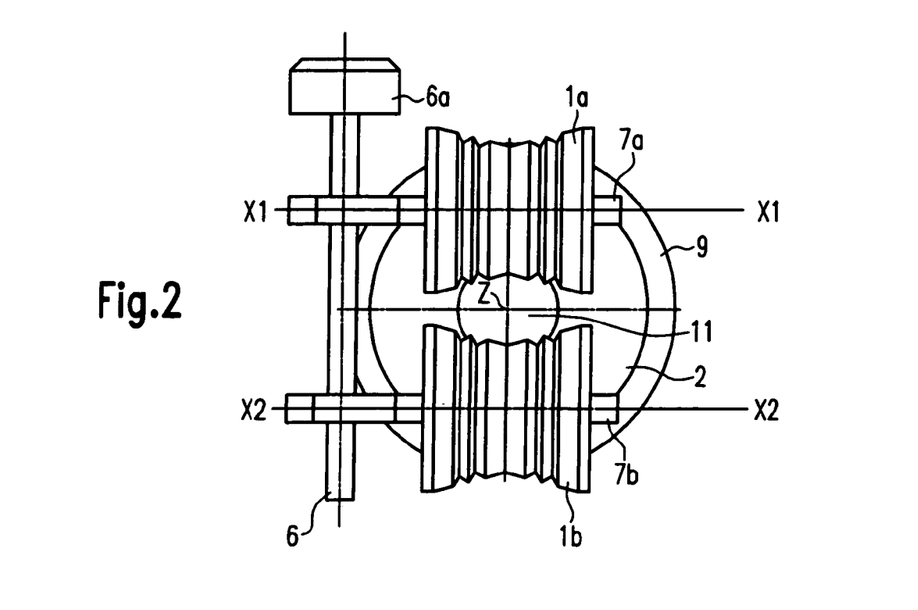
FIG. 2 shows the rollers illustrated in FIG. 1, from the front.

The twist-off device shown in FIG. 3 is illustrated in more detail in FIGS. 1 and 2, the rollers 1a, b in FIG. 3 being shown to be rotated by 90° relative to the rollers in FIG. 2. As can be seen in FIG. 1, the apparatus for dividing a sausage strand comprises at least two opposite spaced-apart guide elements 1a and 1b. The guide elements 1a and 1b are here two opposite and rotatably supported rollers spaced apart from each other at a distance b. The upper roller 1a is rotatably supported about axis X1, the lower roller 1b being rotatably supported about axis X2. As can be seen in the figures, axes X1 and X2 extend substantially in a direction perpendicular to the transportation direction T of the filled sausage strand 4. The distance b of rollers 1a, b in the middle of the rollers can be adapted to the sausage caliber. Preferably, the distance b is adjusted such that it corresponds essentially to the diameter of the sausage strand 4, or is slightly smaller than the sausage strand diameter to ensure that, as will be described in the following, the sausage strand 4 can be reliably rotated by the rollers 1a and 1b about a first axis Z extending along the transportation direction T. This enables the sausage strand to move in the transportation direction even if the distance of the guide elements relative to one another has been set to be smaller than the outer diameter of the sausage strand 4 so that the sausage strand can reliably be rotated on the outer diameter by means of the guide elements.

The distance of the rollers can be adjusted via a means for adjusting the distance of the opposite guide elements. In this embodiment, the means is an adjustment spindle 6 with an adjustment handle 6a. The distance b of the rollers can be adjusted via said adjustment spindle and, in addition, the rollers can also be aligned centrally relative to the filling tube center Z (see FIG. 2). The surface of the rollers 1a, 1b may comprise several surrounding grooves, as shown in FIG. 2. Like the concave cross-section, said grooves have the effect that the filled sausage strand 4 can be firmly held by the rollers 1a, b while being rotated about axis Z and can nevertheless easily move along the transportation direction T while being transported in the transportation direction T.

As can be seen in FIG. 1, the rollers 1a and 1b which are rotatably supported about the X1 and X2 axes are secured to a means for jointly rotating 2 the guide elements 1a, 1b. In this instance the means for jointly rotating 2 the holding elements 1a, b comprises a sleeve 2 to which the rollers 1a, b are secured. The sleeve 2 has a tubular member and an adjoining flange to which the rollers are secured in opposite fashion. The inner diameter d of the sleeve 2 is in general larger than the product caliber. The sleeve 2 is rotatably supported about the first axis Z in the housing 9 via bearing 10. The sleeve 2 is rotated via drive 3 about the Z axis, whereby the opposite rollers 1a and 1b are also rotated together about the Z axis, as shown by arrow R. The sleeve drive 3 may e.g. be a belt drive.

To effect the entry of the twist-off point in the sausage strand at point S (see FIG. 1), a retaining anti-rotation system 5 is provided. Suited are here systems such as a conveyor belt which e.g. comprises two spaced-apart endless belts holding the sausage strand such that it cannot rotate relative to the Z axis, or two spaced-apart endless transport chains which retain the filled sausage strand 4 such that it cannot rotate about the Z axis, or corresponding spaced-apart rotatable rollers. Possible is also a manual method in which the sausage strand 4 is held by hand to prevent rotation about the Z axis, so that the twist-off point S can be formed. To create the twist-off point S in transportation direction after the guide elements 1a, 1b, the retaining anti-rotation system is arranged in the transportation direction T downstream of the guide elements 1a and 1b.

Figure 10:
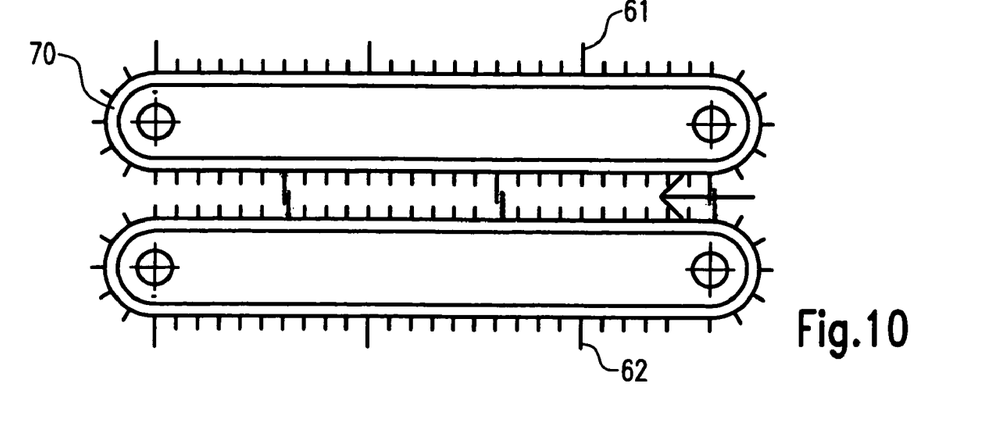
FIG. 10 is a schematic illustration showing a chain transport system.
Figure 12A:
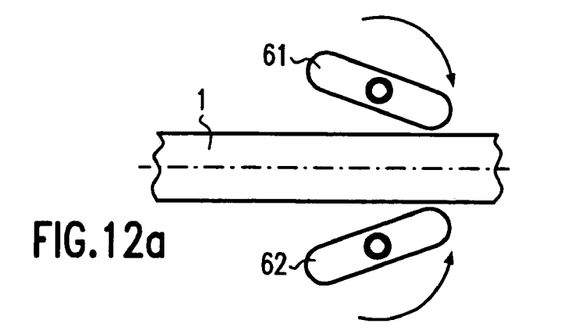
FIGS. 12a, 12b, 12c schematically shows a displacer unit.
Figure 12B:
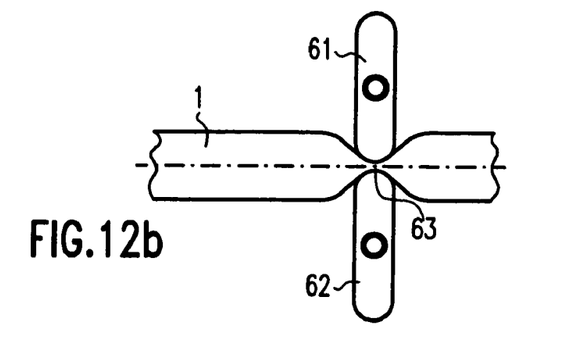
Figure 12C:
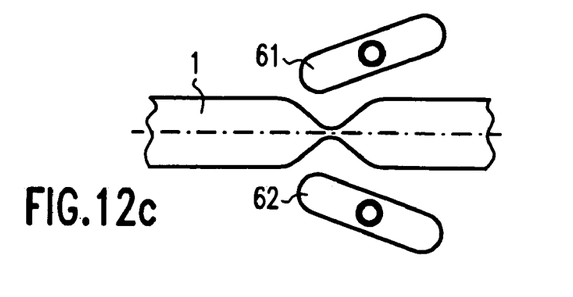

For creating the twist-off point, a displacer unit 61, 62 may auxiliarily be arranged, as shown in FIGS. 12a, b, c, also in transportation direction downstream of the guide elements, e.g. the rollers 1a, 1b, the sausage casing being then torsion-biased by rotating the rollers 1a, b about axis Z and the twist-off point S being created after engagement of the displacer elements 51, 61 at a point exactly defined in the transportation direction T. As a result, uniform sausage lengths and equal portion weights can be produced. As follows from FIGS. 12a, b, c, the displacer unit comprises two rotatably supported displacer units 61, 62 operating opposite to and in synchronism with one another. When the displacer unit 61, 61 is closed or in engagement, as shown in FIG. 12b, the inner mass is displaced relative to the solidified outer mass, i.e. the sausage casing. This creates a void in the sausage strand. To prevent the sausage strand from shearing off, a gap 63 is provided between the closed displacers 61, 62, as can be seen in FIG. 12b. The size of said gap 63 can be adjusted and depends on the thickness of the casing. After the product strand has been subdivided by moving the displacers 61, 62, the twisted-off and thus torsion-biased strand can relax in that a constriction, i.e. the desired twist-off place, enters into the displaced void. The length of the portion is variable and is defined by the control of the drive (not shown) of the displacer unit 6. The number of twist-off points is also variable, as has already been mentioned, and is defined by the control of the drive for the means for jointly rotating the guide elements about the first Z axis. The same effect is achieved with an endless chain transport system, as shown in FIG. 10. The transport chain 70 comprises displacer elements 61 projecting at equal distances. Other displacer shapes are also possible, e.g. V-shaped meshing displacer elements.

Before the sausages are produced, the distance of the rollers 1a, 1b relative to each other is first adjusted via the spindle 6 in such a way that, as has been described above, it is adapted to the corresponding sausage caliber and the position of the rollers relative to the filling tube center is centered in addition. Either a sausage casing held on the filling tube 8 via a retaining device (not shown), or a sausage casing produced by the coextrusion head 13 is now filled with sausage meat via the filling tube 8 in the known manner. As becomes apparent from FIG. 3, the filled sausage strand is conveyed by the sleeve 2 and the spaced-apart rollers 1a, b in the transportation direction T. The filled sausage strand 4 is e.g. advanced via the retaining anti-rotation system 5 which moves the filled sausage strand 4 in the transportation direction T. Due to the fact that the rollers 1a and 1b are rotatably supported about axes X1 and X2, they co-rotate about axes X1 and X during movement of the filled sausage strand 4 in the transportation direction T, whereby the surfaces of the rollers 1a, 1b move in axial direction so that the resistance between sausage strand surface and roller surface is kept small although the distance b of the rollers 1a, 1b relative to one another has been chosen such that the sausage strand 4 can be entrained by the rollers 1a, b and rotated in Z-axis. Twisting off is carried out by rotating the sleeve 2 about axis Z, whereby both rollers 1a and 1b are also jointly rotated about axis Z and rotate the sausage strand 4 also about the Z axis. The rotation of the sausage strand about the Z axis by means of the caliber-adjustable guide elements almost yields a form fit, which permits a reliable rotation together with a gentle transportation via the rotatably supported rollers in the transportation direction. The system 5 which retains the sausage strand 4 behind the rollers 1a, b creates the constriction point S due to the rotation of the sleeve and the rollers 1a, 1b. During the twist-off operation the filling tube 8 may be co-rotated, as shown by arrow D in FIG. 3.

The retaining operation for preventing rotation may be carried out manually or also by transportation means which additionally contribute to the further transportation of the sausage strand. As has been described, the process can take place during portioning (intermittent) operation. At increased outputs of the filling machine or also during production with co-extruded sausage casings, in the case of which a constant filling flow is ejected, the sausage strand 4 can be torsion-biased, as has already been described, and produce the twist-off point S with a displacer unit or displacer chains.

The sleeve 2 will be rotated for such a long time until the necessary twist-off number has been achieved. The filled sausage strand 4 is moved on by a specific length in the transportation direction T, the length depending on the desired sausage length. Thereupon a renewed twisting-off process of the sausage strand is carried out by rotating the sleeve, as has been described previously.

Figure 4:
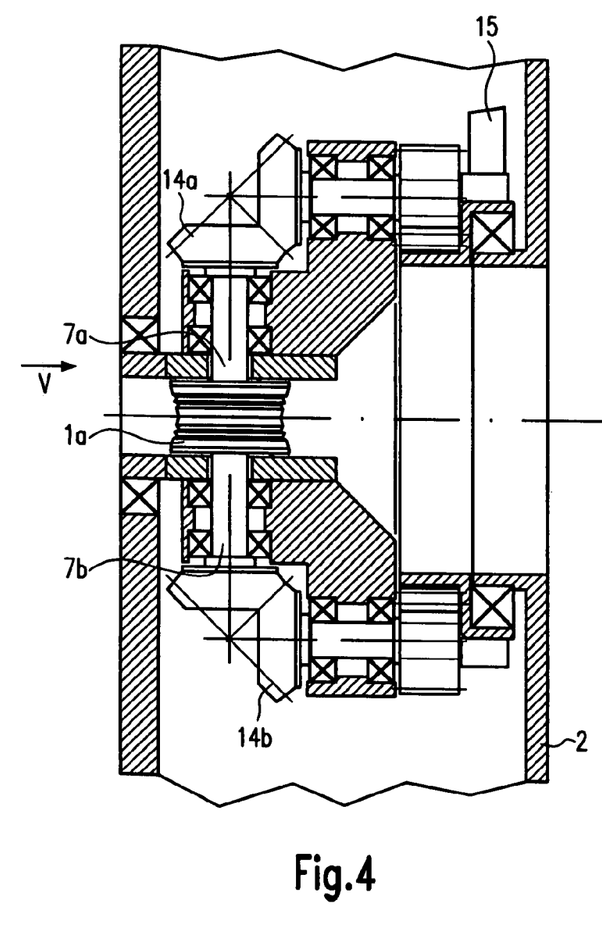
FIG. 4 is a schematic top view on a possible drive for the rollers shown in FIG. 1.
Figure 5:
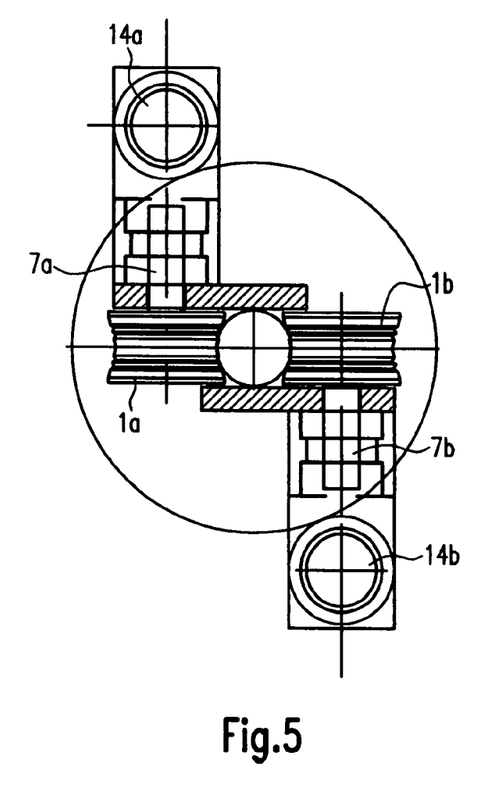
FIG. 5 is a front view of the drive shown in FIG. 4.

According to a preferred embodiment, the rollers 1a and 1b may be supported to be not only rotatable about axes X1, X2, but may additionally be driven by a drive around axes X1, X2 so that the resistance between the roller surface and the sausage strand is again reduced and the sausage strand can additionally be moved via the rollers also in transportation direction T. When the rollers 1a, 1b are drivable, the sausage strand 4 can be advanced via said rollers, so that when it is e.g. retained manually to prevent rotation, no additional drive is needed for the sausage strand 4. However, it is not necessary that both rollers be driven, but it is quite sufficient to drive only one roller, the opposite roller then freely rotating therewith. FIGS. 4 and 5 show an example as to how such a roller drive could look like. FIG. 4 is a top view on the rollers shown in FIG. 1, and FIG. 5 is a front view of the rollers shown in FIG. 4, from direction V. As can be seen in FIG. 4, the roller 1a, which is arranged on shaft 7a, is driven via the angular gear 14a through drive 15. Drive 15 may e.g. be a toothed belt. The opposite roller 1b is seated on shaft 7b and is driven via the angular gear 14b by the same drive 15. In this embodiment, one drive motor each may be provided for rotation about axes X1 and X2 of the guide elements, i.e. the rollers 1a, b, and for driving the means for rotating the guide elements about the Z axis, i.e. for rotating the sleeve 2 about the Z axis. The drive motors must then be synchronized accordingly to regulate the necessary parameters, such as sausage length and twist-off number, in a corresponding manner. As an alternative, a drive motor may also be provided with a gear for coupling the two movements, i.e. the rotation about the X1, X2 axis and the rotation about the Z axis.

Figure 6:
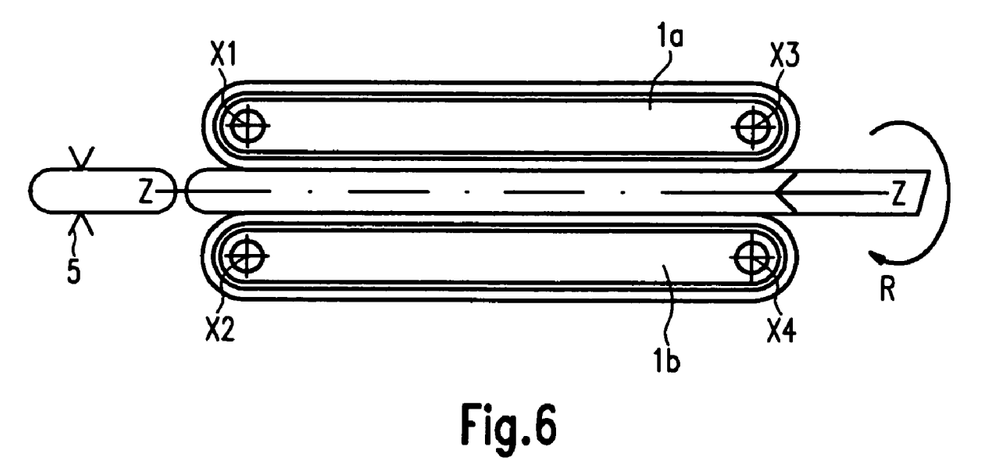
FIG. 6 is a schematic side view showing an apparatus for dividing a sausage strand according to a second embodiment of the present invention.
Figure 7:
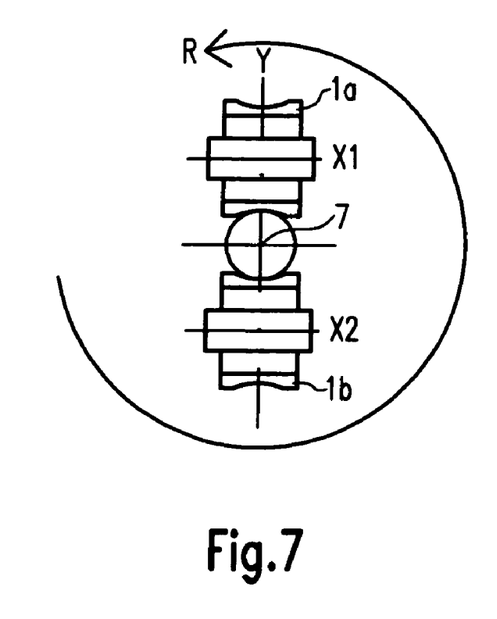
FIG. 7 is a schematic front view of the apparatus shown in FIG. 6.

A pair of rollers 1a, 1b as the guide element has been described in connection with FIGS. 1 to 5. The present disclosure, however, is not limited to such a pair of rollers. For instance, several series-arranged roller pairs may also be provided as guide elements that are jointly rotated about the Z axis. As an alternative, slide surfaces with a low coefficient of friction may also be used as guide elements, the distance of said slide surfaces relative to one another being then adjustable, as described before. As an alternative, as shown in FIGS. 6 and 7, conveyor belts with longitudinal and rotational movement may be used, as shown in FIGS. 6 and 7. As follows from FIG. 6, two endless conveyor belts are used having a distance which is adjustable, as described in connection with the examples given in FIGS. 1 to 5, and being adaptable to the sausage caliber. The conveyor belts are also rotating about an axis perpendicular to the transportation direction T, so that, just like the rollers, the conveyor belts are also moving in axial direction, which in turn reduces the resistance between sausage strand 4 and belt surface. The conveyor belts may rotate either loosely and move along with the movement of the sausage strand 4 in the transportation direction T or, however, as described in connection with FIGS. 1 to 5, they may be driven separately. Instead of the conveyor belts, it is e.g. also possible to use corresponding transport chains. The remaining features of said embodiments correspond to the features explained with reference to FIGS. 1 to 5, a repetition of said features and their functions being here omitted. It has been described in connection with FIGS. 1 and 5 that the guide elements are arranged on a rotatable sleeve. The device, however, need not necessarily comprise a rotatable sleeve 2, but it may just have a means which makes sure that the opposite guide elements are jointly rotated about axis Z.

The drive of the filling tube can be synchronized with the drive 3 of the means for jointly rotating the guide elements. Preferably, the two units are driven by a drive, possibly coupled via a gear.

When driven guide elements are used, i.e. guide elements which also move in Z axis direction, i.e. transportation direction, e.g. driven rollers, conveyor belts or transport chains, a further drive is not needed for the sausage strand 4 in the transportation direction.

The apparatus according to the invention may further comprise a control means which controls the functions of the filling unit, such as filling amount, filling speed, with respect to the functions of the twist-off device, i.e. e.g. rotational speed of the means for jointly rotating the guide elements 1a, b and the transportation speed of the filled sausage strand, and possibly the clock frequency, to achieve a specific sausage length and twist-off number.

Figure 11A:
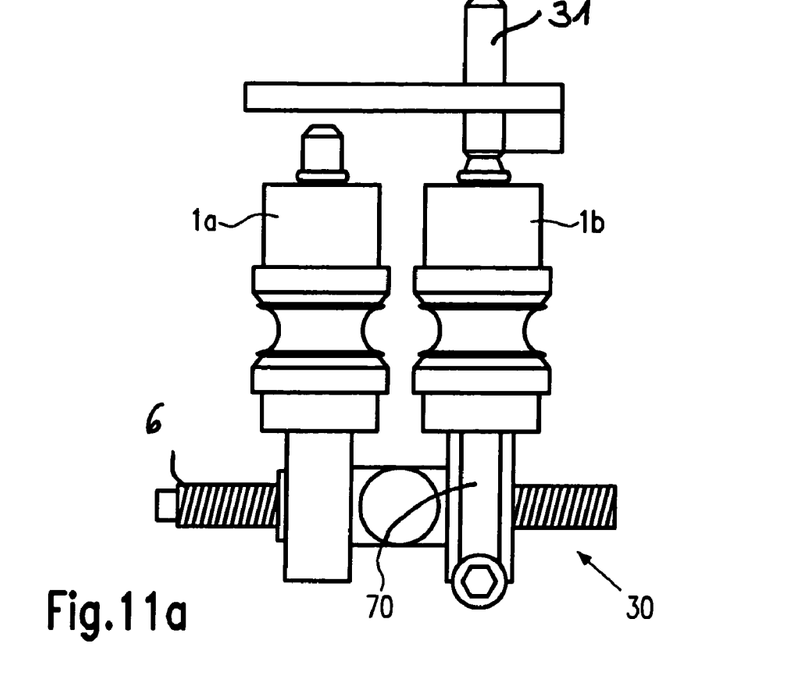
FIG. 11a schematically shows a further embodiment of the guide elements according to the present disclosure with rollers in the closed state.
Figure 11B:
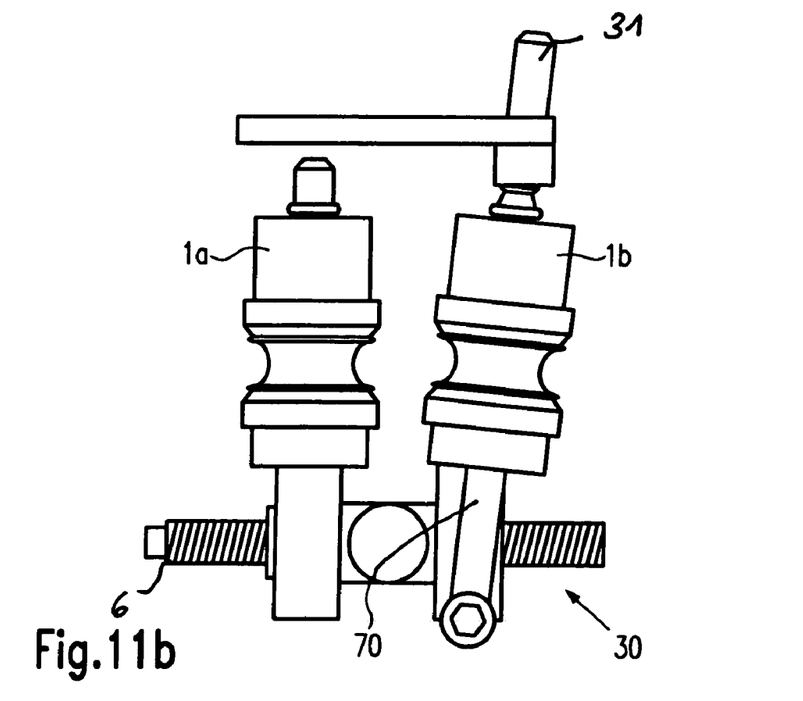
FIG. 11b shows the embodiment illustrated in FIG. 11a with spread rollers.

FIG. 11 schematically shows a further embodiment of the guide elements according to the present disclosure. As has already been described above, the distance of the guide elements relative to one another is adjusted such that it is smaller than the outer diameter of the sausage strand, so that the sausage strand can be rotated by the guide elements about the Z axis. At the beginning of the strand the problem arises that the soft sausage strand can only be threaded in with great difficulty between the guide elements e.g., the rollers, or is accumulated. That is why the guide elements must first be adjusted somewhat wider at the beginning of production and after the sausage strand has been passed through the guide elements 1a, b, they can be adjusted more narrowly again. This, however, has the effect that production must be interrupted once again for changing the adjustment and the beginning of the sausage strand cannot be changed because of the changed production.

As an alternative, use is made of the embodiment as shown in FIGS. 11a, b. This embodiment is substantially identical with the ones shown in FIGS. 1 to 10, but comprises a further means 30 in the case of which at least one roller shaft 70 is pivotably arranged and holds the one or both guide elements 1a, b with a resilient force at the set caliber. Prior to start of production one or several guide elements 1a, b can be spread apart against the resilient force and optionally locked. After the sausage strand 4 has been threaded in at the beginning of production, said locking is e.g. undone by a lever 31 secured to the housing, and the guide elements 1, b, enter again into the position set for the sausage caliber, so that the production process need not be interrupted.

Figure 13:
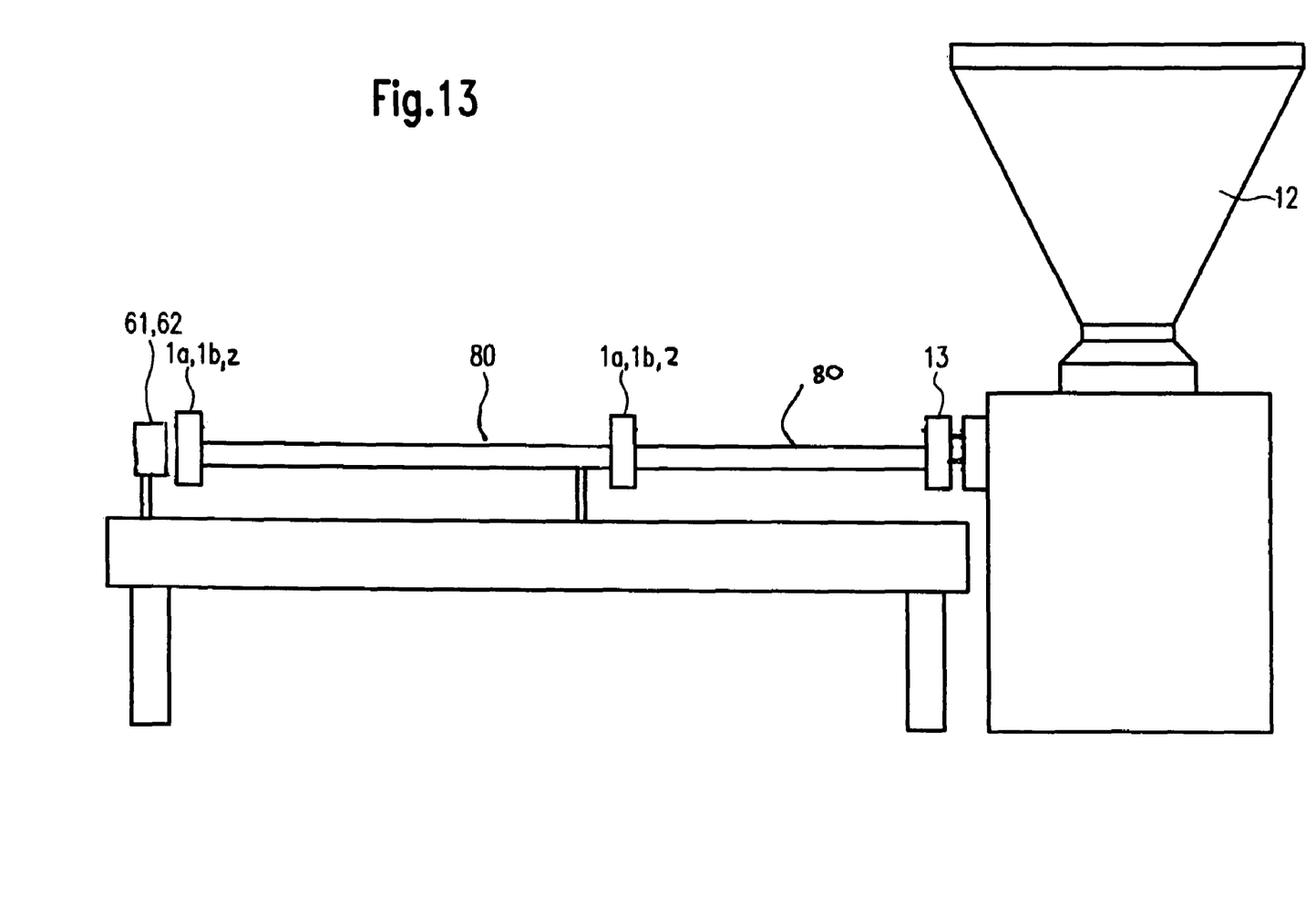
FIG. 13 is a perspective view showing an apparatus for making sausage with a plurality of guide elements.

FIG. 13 shows a further embodiment of the present disclosure in which several inventive devices (units of opposite spaced-apart guide elements 1*a*, *b* which are jointly rotated about the Z axis) are arranged one after the other in the transportation direction and are driven preferably in synchronism with each other, as has been described above. The distance of such units is within a range of 10 cm to 250 cm. The arrangement of several units 1*a*, *b* one after the other entails the advantage that particularly in the case of co-extruded sausage casings the sausage casing that has not hardened yet does not tear off. As follows from FIG. 13, a guide, here: a guide trough 80,is provided between the two units. A displacer unit with corresponding displacer elements 61, 62 is e.g. arranged in transportation direction after the last, here: the second, unit with the corresponding guide elements 1*a*, *b*, as has been described previously.

In the above-illustrated embodiments, guide elements 1*a*, *b* that are opposite to one another relative to the Z axis have been described. For instance, at least two opposite guide elements may be arranged in the transportation direction. The expression "at least two opposite guide elements" also encompasses embodiments in which several guide elements are arranged offset by a specific angle about the Z axis, e.g. three guide elements which are offset by about 120° relative to the Z axis.

We claim:

1. An apparatus for dividing a sausage strand comprising:
   at least two opposite spaced-apart guide elements (1*a*, *b*) having a distance (b) which can be adapted to a sausage caliber such that the filled sausage strand (4) can be moved between and through the guide elements (1*a*, *b*) in a transportation direction along a first axis (Z axis) and rotated by the guide elements (1*a*, *b*) about said first axis (Z axis), and
   a means (2, 3) for jointly rotating the guide elements (1*a*, *b*) about the first axis (Z axis), wherein at least one guide element (1*a*, *b*) is rotatably supported about a second axis (X1, X2 axis) perpendicular to the first axis (Z axis).

2. The apparatus according to claim 1, wherein the apparatus further comprises a means which holds at least one guide element (1*a*, *b*) with a resilient force at a set caliber.

3. The apparatus according to claim 1, wherein the apparatus further comprises a drive (15) for the guide elements (1*a*, *b*) to rotate at least one of the guide elements (1*a*, *b*) about the second axis (X1, X1 axis).

4. The apparatus according to claim 1, and a filler tube (8) and wherein the apparatus comprises a means (6) for adjusting the distance (b) of the opposite guide elements (1*a*, *b*) relative to one another and for centrally aligning the opposite guide elements (1*a*, *b*) relative to the filling tube (8).

5. The apparatus according to claim 4, wherein the means (6) for adjusting the distance (b) of the opposite guide elements (1*a*, *b*) comprises an adjustment spindle (6) for adjusting the position of the guide elements relative to one another.

6. The apparatus according to claim 1, wherein the means (2, 3) for jointly rotating the guide elements (1*a*, *b*) about the first axis comprises a driven sleeve (2) which is rotatably supported about the first axis (Z axis) and on which the guide elements (1*a*, *b*) are secured opposite each other so that they rotate with the sleeve (2) about the first axis (Z axis).

7. The apparatus according to claim 1, wherein the guide elements (1*a*, *b*) comprise one of rollers, endless conveyor belts, endless transportation chains, and slide surfaces.

8. The apparatus according to claim 1, wherein the apparatus further comprises a means (5) for retaining the filled sausage strand (4) the means being arranged in the transportation direction (T) behind the guide elements (1*a*, *b*).

9. The apparatus according to claim 8, wherein in the transportation direction after the guide elements (1*a*, *b*) the apparatus comprises a displacer unit with displacer elements (61, 62) for producing a twist-off location.

10. An apparatus for making sausage with a filling unit (16), comprising:
    a filling tube (8) for filling sausage casings,
    a first pair of opposite spaced-apart guide elements (1*a*, *b*) having a distance (b) which can be adapted to be a sausage caliber such that the filled sausage strand (4) can be moved between and through the guide elements (1*a*, *b*) about said first axis (Z axis), and
    a means (2, 3) for jointly rotating the guide elements (1*a*, *b*) about the first axis (Z axis), wherein at least one guide element (1*a*, *b*) is rotatably supported about a second axis (X1, X2 axis) perpendicular to the first axis (Z axis), and wherein the guide elements are arranged in transportation direction (T) behind the filling tube (8).

11. The apparatus for making sausage according to claim 10, wherein the filling tube (8) is rotatable about the first axis (Z axis) and the drive for the filling tube is synchronized with the drive (3) of the means (2, 3) for rotating the guide elements (1*a*, 1*b*).

12. The apparatus for making sausage according to claim 10, wherein the apparatus further comprises a coextrusion head (13) for producing a co-extruded sausage casing.

13. The apparatus for making sausage according to claim 10, further comprising at least a second pair of spaced-apart guide elements aligned with the first pair of spaced-apart guide elements one after the other in transportation direction for dividing a sausage strand.

14. A method for dividing a sausage strand (4), comprising the following steps:
    filling a sausage strand (4) with a filling tube (8) of a filling unit (16),
    guiding the filled sausage strand (4) in a transportation direction (T) through at least two opposite spaced-apart guide elements (1*a*, *b*) whose distance is adapted to the sausage caliber, so that the sausage strand can move between the guide elements in the transportation direction along a first axis (Z axis),
    rotating the guide elements (1*a*, *b*) about the first axis, whereby the filled sausage strand (4) is also rotated about the first axis, and
    supporting the filled sausage strand (4) at a place in the transportation direction (T) behind the guide elements (1*a*, *b*) while the filled sausage strand (4) is being rotated about the first axis, wherein at least one guide element (1*a*, *b*) is rotatably supported about a second axis (X1, X2 axis) perpendicular to the first axis (Z axis).

15. The method according to claim 14, and rotating the filling tube (8) during rotation of the guide elements (1*a*, *b*).

16. The method according to claim 14, and moving at least one of the guide elements (1a, b) along during transportation of the filled sausage strand (4) in the transportation direction (T).

17. The method according to claim 14, and driving at least one guide element (1a, b) during transportation of the filled sausage strand (4) in the transportation direction (T) so that it rotates about a second axis perpendicular to the first axis.

18. The method according to claim 17, and synchronizing a drive for rotating the guide elements (1a, b) about the first axis with the drive for rotating the guide elements (1a, b) about the second axis.

19. The method according to claim 15 or 18, and synchronizing the drive for rotating the guide elements (1a, b) about the first axis with the drive of the filling tube (8).

20. The method according to claim 14, wherein prior to the filling of the sausage strand (4) the distance between the guide elements is adapted to the sausage caliber.

21. The method according to claim 14, and centrally aligning the opposite guide elements (1a, b) relative to the filling tube (8).

22. The method according to claim 14, and adjusting the distance of the guide elements to be larger than the sausage strand diameter, passing the sausage strand end therethrough, and then setting the distance of the guide elements to be one of smaller than and equal to the sausage strand diameter.

23. The method according to claim 14 or 22, and extruding the casing of the sausage strand from a coextrusion head 13 during filling.

24. An apparatus for dividing a sausage strand comprising:
   at least two opposite spaced-apart guide elements (1a, b) having a distance (b) which can be adapted to a sausage caliber such that the filled sausage strand (4) can be moved between and through the guide elements (1a, b) in a transportation direction along a first axis (Z axis) and rotated by the guide elements (1a, b) about said first axis (Z axis),
   a filler tube (8) and wherein the apparatus comprises a means (6) for adjusting the distance (b) of the opposite guide elements (1a, b) relative to one another and for centrally aligning the opposite guide elements (1a, b) relative to the filling tube (8); and
   a means (2, 3) for jointly rotating the guide elements (1a, b) about the first axis (Z axis).

25. The apparatus according to claim 24, wherein the means (6) for adjusting the distance (b) of the opposite guide elements (1a, b) comprises an adjustment spindle (6) for adjusting the position of the guide elements relative to one another.

* * * * *

UNITED STATES PATENT AND TRADEMARK OFFICE
CERTIFICATE OF CORRECTION

PATENT NO. : 7,140,958 B2
APPLICATION NO. : 11/082255
DATED : November 28, 2006
INVENTOR(S) : Siegfried Reutter et al.

It is certified that error appears in the above-identified patent and that said Letters Patent is hereby corrected as shown below:

On the Title Page:

Line (75), 3$^{rd}$ Inventor, "Bachtle" should be -- Bächtle --.

Line (73), "Co," should be -- Co. --.

In the Claims:

Column 9, line 53, "X1, X1 axis" should be -- X1, X2 axis --.

Column 11, lines 9-10, "synchoronizing" should be -- synchronizing --.

Signed and Sealed this

Eighth Day of May, 2007

JON W. DUDAS
*Director of the United States Patent and Trademark Office*